US010068351B2

(12) United States Patent
Lachner et al.

(10) Patent No.: US 10,068,351 B2
(45) Date of Patent: Sep. 4, 2018

(54) AUTOMATIC DETECTION AND IDENTIFICATION OF BRAIN SULCI IN MRI (71) Applicant: Brainlab AG, Munich (DE)

(72) Inventors: Rainer Lachner, Munich (DE); Mona Frommert, Munich (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 15/533,307

(22) PCT Filed: Feb. 25, 2016

(86) PCT No.: PCT/EP2016/054024
§ 371 (c)(1),
(2) Date: Jun. 5, 2017

(87) PCT Pub. No.: WO2017/144107
PCT Pub. Date: Aug. 31, 2017

(65) Prior Publication Data
US 2018/0108148 A1 Apr. 19, 2018

(51) Int. Cl.
G06K 9/00 (2006.01)
G06T 7/73 (2017.01)
(Continued)

(52) U.S. Cl.
CPC .............. G06T 7/74 (2017.01); G06T 5/009 (2013.01); G06T 7/90 (2017.01);
(Continued)

(58) Field of Classification Search
CPC .......... G06T 7/74; G06T 2207/10088; G06T 2007/20036; G06T 2007/20221;
(Continued)

(56) References Cited

U.S. PATENT DOCUMENTS

2004/0096089 A1* 5/2004 Borsook ............... A61B 5/055
382/131
2006/0270926 A1 11/2006 Hu et al.
(Continued)

FOREIGN PATENT DOCUMENTS

CN 101515367 A 8/2009

OTHER PUBLICATIONS

Guevara P, et al., "Automatic fiber bundle segmentation in massive tractography datasets using a multi-subject bundle atlas", Neuromiage, Academic Press, vol. 61 No. 4, Feb. 24, 2012, pp. 1083-1099, XP028490439, Orlando, Florida, U.S.A.
(Continued)

Primary Examiner — Tom Y Lu
(74) Attorney, Agent, or Firm — Tucker Ellis LLP (57) ABSTRACT Disclosed is a method for determining a position of a brain sulcus in the brain of a patient, the method comprising executing, on at least one processor of at least one computer, steps of: acquiring, at the at least one processor, patient image data describing a digital medical image of at least part of the brain; acquiring, at the at least one processor, atlas data describing an image-based model of the at least part of the brain; determining, by the at least one processor and based on the patient image data and the atlas data, mapping data describing a transformation between the patient image data and the atlas data; and determining, by the at least one processor and based on the patient image data and the atlas data and the mapping data, sulcus position data describing the position of the brain sulcus in the digital medical image.

17 Claims, 6 Drawing Sheets (51) Int. Cl.
*G06T 7/90* (2017.01)
*G06T 5/00* (2006.01)

(52) U.S. Cl.
CPC ............... *G06T 2207/10024* (2013.01); *G06T 2207/10088* (2013.01); *G06T 2207/20036* (2013.01); *G06T 2207/20208* (2013.01); *G06T 2207/20221* (2013.01); *G06T 2207/30016* (2013.01)

(58) Field of Classification Search
CPC . G06T 2007/30016; G06T 7/90; G06T 5/009; G06T 2007/10024; G06T 2007/20208
See application file for complete search history.

(56) References Cited

U.S. PATENT DOCUMENTS

2009/0087066 A1* 4/2009 Odry .................... G06K 9/4609
382/131

2009/0149898 A1* 6/2009 Hulvershorn ...... A61N 1/36082
607/3

OTHER PUBLICATIONS

Wieslaw L. Nowinski, et al., "Atlas-based identification of cortical sulci", Optical Sensing II, vol. 2707, Apr. 15, 1996, pp. 64-74, XP055317608, Bellingham, WA, U.S.A.

Ikuko Uwano, et al., "Computer-Assisted Identification of the Central Sulcus in Patents With Brain Tumors Using MRI", Journal of Magnetic Resonance Imaging, Apr. 17, 2008, vol. 27., pp. 1243-1249, DOI 10.1002/jmrt.21373, Wiley-Liss, Inc. © Japan.

Mutawarra Hussain et al., "Sulcus detection in planar projections of cortical surfaces", School of Computer Science, The University of Birmingham, Birmingham B15 2TT, (2008) pp. 1-4.

International Search Report and Written Opinion for PCT/EP2016/054024 dated Nov. 22, 2016. pp. 1-13 European Patent Office, NL.

* cited by examiner

Fig. 11

AUTOMATIC DETECTION AND IDENTIFICATION OF BRAIN SULCI IN MRI

RELATED APPLICATION DATA

This application is a national phase application of International Application No. PCT/EP2016/054024 filed Feb. 25, 2016 in the English language.

The present invention relates to a computer-implemented method for determining a position of a brain sulcus in the brain of a patient, a corresponding computer program, a non-transitory program storage medium storing such a program and a computer for executing the program, as well as a system determining a position of a brain sulcus in the brain of a patient comprising an electronic data storage device and such a computer.

TECHNICAL BACKGROUND

Known methods of determining the position of a sulcus on the human cortex basically aim at generating a topologically correct cortex surface rather than determining the precise location of major sulci. The majority of the prior art puts emphasis on a single sulcus (in most cases the central sulcus). The few methods capable of identifying several major sulci are either heavy in terms of processing time or require vast amounts of prior work (e.g. model generation from training data). Prior art methods almost exclusively operate on a single imaging modality (for example, T1 without contrast).

The present invention allows for a more efficient and more precise determination of a position of a brain sulcus in the brain of a patient.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE PRESENT INVENTION

In the following, a short description of the specific features of the present invention is given which shall not be understood to limit the invention only to the features or a combination of the features described in this section.

The disclosed method encompasses determining the position of a brain sulcus in medical image data such as a magnetic resonance image by first classifying the tissue in the image by comparison to an atlas to generate a mask for determining the difference in the image between the union of cortical grey brain matter and cortical cerebrospinal fluid on the one hand and white brain matter on the other hand. The masked image is transformed into a curved coordinate system resembling the anatomy of the patient's skull, and the position of the brain sulcus is determined in the curved coordinate system, and then transformed back into the three-dimensional coordinate system of the original magnetic resonance image. The position of the brain sulcus can then be visualised in the original image.

GENERAL DESCRIPTION OF THE PRESENT INVENTION

In this section, a description of the general features of the present invention is given for example by referring to possible embodiments of the invention.

In general, the invention reaches the aforementioned object by providing, in a first aspect, a computer-implemented method for determining a position of a brain sulcus in the brain of a patient. The method comprises executing, on at least one processor of at least one computer, the following exemplary steps which are executed by the at least one processor.

In a (for example first) exemplary step, patient image data is acquired which describes (for example, defines) a digital medical image of at least part of the brain of the patient. The patient image data describes colour values defining the digital medical image, for example the appearance and/or the information content of the digital medical image. In one example, the patient image data allows for a differentiation between grey and white brain matter. The patient image data may in one example be tomographic image data (and therefore may be defined in three-dimensional coordinates) which has been generated by applying a tomographic imaging modality to the patient's body (specifically, the at least part of the patient's brain). More specifically, the patient image data may have been generated by application of a computed x-ray or magnetic resonance imaging modality to the at least part of the brain.

In a further (for example second) exemplary step, atlas data is acquired which describes (for example, defines) an image-based model of the at least part of the brain. For example, the atlas data describes colour values defining the image-based model, for example the appearance and/or the information content of the image-based model.

In a further (for example third) exemplary step, mapping data is determined which describes (for example, defines) a transformation between the patient image data and the atlas data. The mapping data is hence determined based on the patient image data and the atlas data.

In one example of this for example third step, the image-based model and the digital medical image have been generated with the same imaging modality. In another example, the image-based model and the digital medical image have been generated with different imaging modalities and the atlas data comprises a mapping between a colour value range associated with the imaging modality used for generating the digital medical image and a colour value range associated with the imaging modality used for generating the image-based model. Thereby, a colour value-based comparison of positions between the digital medical image and the image-based model is possible even if the two data sets have been generated with different imaging modalities. Specifically, the mapping between colour value ranges establishes a mapping between different colour values describing (for example, defining) the same anatomical tissue. The difference in colour values is for example due to the different physical response (e.g. absorption) of the anatomical tissue in dependence on the imaging modality applied.

In another example of this for example third step, mapping data is determined which describes (for example, defines) a transformation between the patient image data and the atlas data. In one example, the transformation is determined as an output of applying an image fusion algorithm to the patient image data (the digital medical image) and the atlas data (the image-based model) so that a spatial relationship is established as the transformation between positions in both data sets which are associated with a geometry of image information which is similar to a predetermined degree. The image fusion algorithm is able to map positions in the digital medical image onto positions in the image-based model by determining geometric similarities on both data sets. In another example, the mapping data is determined for example by comparing the colour values of the atlas data to the colour values of the patient image data and establishing a spatial relationship between positions in the digital medical image and positions in the image-based model having colour values which are similar to a predetermined degree (which may also include a similarity in the colour values taking into account the colour values of respectively neighbouring positions). This spatial relationship defines the transformation which hence constitutes a mapping (for example, linear mapping) between positions in the coordinate system defining positions in the digital medical image and positions coordinate system defining positions in the image-based model. The positions in the digital medical image and the positions in the image-based model are in one example associated with image information describing (for example defining) corresponding anatomical structures. The atlas data comprises information about the type of anatomical tissue associated with each colour value and/or position defined in the image-based model. On that basis, the transformation can be used to classify the type of anatomical tissue described by each colour value and/or position in the digital medical image. To this end, each colour value defining the digital medical image in one example is associated with information describing (for example defining) a type of anatomical tissue and each colour value defining the image-based model is in that example associated with information about a type of anatomical tissue, and the disclosed method comprises in that example a step of determining, based on the mapping data and the atlas data and the patient image data, tissue type data describing (for example defining) at least one type of anatomical tissue described (for example defined) by the digital medical image and the position of the at least one type of anatomical tissue in the digital medical image. Based on the tissue type data, sulcus mask data may be determined which describes (for example defines) a binary mask which can be applied to (for example, laid onto) the digital medical image for masking it in order to differ, in the digital medical image, between the union of cortical grey brain matter and cortical cerebrospinal fluid on the one hand and white brain matter on the other hand.

The atlas data in one example serves as a basis for determining (for example, at least estimating) the position of the brain sulcus, for example if the atlas data comprises information about the designation (name) of the brain sulcus associated with a specific position in the image-based model and the method acquires the corresponding information (for example, based on user input such as selection from a list of sulcus names), the transformation can be applied to that specific position in order to determine the corresponding position in the digital medical image.

In one exemplary embodiment of this feature, the disclosed method comprises a step of acquiring sulcus identification data describing (for example defining) the identity (the designation/name) of at least one brain sulcus. The mapping data is then determined based on also the sulcus identification data, for example by determining the position of the brain sulcus described by the sulcus identification data in the image-based model.

In a further (for example fourth) exemplary step, sulcus position data is determined which describes (for example defines) the position of the brain sulcus in the digital medical image. The sulcus position data is determined based on the patient image data and the atlas data and the mapping data.

The digital medical image is in one example represented by a data set (the patient image data) representing a curved surface which is defined in for example in three dimensions $r(\theta,\varphi)$, and wherein the sulcus position data is determined in a projection of the digital medical image onto a planar surface which is defined in for example two dimensions (x, y). The projection of the digital medical image is determined by projecting a curved surface in the patient image data, which is at least substantially parallel to an outer surface of the brain, onto a planar surface, wherein the curved surface is defined based on a spherical harmonics expansion of the outer brain surface up to a predetermined order, for example up to order seven. The curved surface of a given distance to the outer surface is defined by its radius $r(\theta,\varphi)$ as a function of the angular coordinates $\theta$ and $\varphi$ in the digital medical image and wherein $r(\theta,\varphi)$ is expanded in real-valued spherical harmonics up to a given order $l_{max}$ so that $$r(\theta,\varphi) = \sum_{l=0}^{l_{max}} \sum_{m=-l}^{l} r_{lm} Y_{lm}(\theta,\varphi) \quad (1)$$

where the real-valued coefficients $r_{lm}$ are obtained by projecting $r(\theta,\varphi)$ onto the corresponding spherical harmonics:

$$r_{lm} = \int_{\theta=0}^{\pi} \int_{\varphi=0}^{2\pi} r(\theta,\varphi) Y_{lm}(\theta,\varphi) \sin\theta \, d\theta \, d\varphi, \quad (2)$$

and the real-valued spherical harmonics $Y_{lm}$ are defined as $$Y_{lm} = \begin{cases} \sqrt{2} \sqrt{\dfrac{(2l+1)(l-|m|)!}{4\pi(l+|m|)!}} \, P_l^{|m|}(\cos\theta) \sin(|m|\varphi) & \text{for } m < 0 \\ \sqrt{\dfrac{(2l+1)}{4\pi}} \, P_l^m(\cos\theta) & \text{for } m = 0 \\ \sqrt{2} \sqrt{\dfrac{(2l+1)(l-m)!}{4\pi(l+m)!}} \, P_l^m(\cos\theta) \cos(m\varphi) & \text{for } m > 0 \end{cases} \quad (3)$$

with $P_l^m(\cos\theta)$ being the associated Legendre polynomials. The curved surface $r(\theta,\varphi)$ is projected onto a planar surface defined by the coordinates x and y, and for example points towards the right lateral side of the brain and the anterior part of the brain, respectively, and wherein $r(\theta,\varphi)$ and (x, y) are related by $$x = r(\varphi - \varphi_0) \text{ and} \quad (4)$$

$$y = r \ln\left[\tan\left(\frac{\pi}{2} - \frac{\theta}{2}\right)\right], \quad (5)$$

wherein the y-axis is defined to be at $\varphi_0$, and where $$\theta = \pi - 2\tan^{-1}(e^{y/r}) \quad (6)$$

$$\varphi = \frac{x}{r} + \varphi_0, \quad (7)$$

in positions in the planar surface are projected onto the curved surface in the digital medical image by determining $r(\theta,\varphi)$ for each pair of (x, y).

In another example, the method comprises a step of determining, based on the sulcus mask data and the relationship between $r(\theta,\varphi)$ and (x, y), projected mask data describing (for example defining) a projection of the binary mask onto the planar surface described by (x, y).

In a further example, the method comprises determining the sulcus position data for the projected digital medical image based on the projected mask data and the projected patient image data, for example by masking the projected digital medical image, namely laying the projection of the binary mask over the projected digital medical image. The method may then also comprise filtering the sulcus position data by applying a two-dimensional filament detection filter such as the Frangi vesselness filter to the sulcus position data to enhance the image contrast of the sulcus. Determining the sulcus position data may then comprise applying a watershed transform to the masked projected digital medical image, and conducting data processing which represents merging the resulting candidate sulcal basins. Alternatively or additionally, the sulcus position data for the projected digital medical image may be determined based on determining candidate sulcal basins described by the sulcus position data, wherein determining the sulcus position data comprises sorting candidate basins being candidates for the sulcus basin of which the position is to be determined, wherein the candidate basins are sorted according to a criterion such as an average distance of a candidate basin from the position of the brain sulcus estimated according to claim 2, the elongatedness of a candidate basin, and/or the directionality of the candidate basin.

In one further example, the projected and masked patient image data is slice image data generated by application of a tomographic imaging modality, and merging the candidate sulcal basins comprises application of an algorithm for calculating a minimal cost path between at least two extremal points of a candidate sulcal basin, wherein the position of a central surface of a sulcus is determined as the union of such minimal cost paths for at least two slice images of the projected and masked patient image data.

In an even further example, the method comprises:
determining, based on the union of minimal cost paths and the projected and masked patient medical image data, re-projected sulcus position data describing the position of the brain sulcus in the three-dimensional digital medical image (described by the angular coordinate system $(r,\theta,\varphi)$) by applying the relationship between $r(\theta,\varphi)$ and $(x, y)$ defined above.

The back-projected sulcus position is then checked as to whether it lies within white matter. This check can be done by comparing the re-projected sulcus position data to atlas data such as the above-described atlas data. To this end, a transformation between the re-projected sulcus position data (the position of the brain sulcus in the three-dimensional digital medical image) and the atlas data can be determined. In one example, the transformation is determined as an output of applying an image fusion algorithm to the re-projected sulcus position data (the position of the brain sulcus in the three-dimensional digital medical image) and the atlas data (the image-based model) so that a spatial relationship is established as the transformation between positions in both data sets which are associated with a geometry of image information which is similar to a predetermined degree. The image fusion algorithm is able to map positions in the three-dimensional digital medical image onto positions in the image-based model by determining geometric similarities on both data sets. In another example, the mapping data is determined for example by comparing the colour values of the atlas data to the colour values of the patient image data and establishing a spatial relationship between positions in the three-dimensional digital medical image and positions in the image-based model having colour values which are similar to a predetermined degree (which may also include a similarity in the colour values taking into account the colour values of respectively neighbouring positions). This spatial relationship defines the transformation which hence constitutes a mapping (for example, linear mapping) between positions in the coordinate system defining positions in the digital medical image and positions coordinate system defining positions in the image-based model. The positions in the three-dimensional digital medical image and the positions in the image-based model are in one example associated with image information describing (for example defining) corresponding anatomical structures. The atlas data comprises information about the type of anatomical tissue associated with each colour value and/or position defined in the image-based model. On that basis, the transformation can be used to classify the type of anatomical tissue described by each colour value and/or position in the three-dimensional digital medical image. To this end, each colour value defining the three-dimensional digital medical image in one example is associated with information describing (for example defining) a type of anatomical tissue and each colour value defining the image-based model is in that example associated with information about a type of anatomical tissue, and the disclosed method comprises in that example a step of determining, based on the mapping data and the atlas data and the patient image data, tissue type data describing (for example defining) at least one type of anatomical tissue described (for example defined) by the three-dimensional digital medical image and the position of the at least one type of anatomical tissue in the three-dimensional digital medical image. Based on the tissue type data, sulcus mask data may be determined which describes (for example defines) a binary mask which can be applied to (for example, laid onto) the three-dimensional digital medical image for masking it in order to differ, in the three-dimensional digital medical image, between the union of cortical grey brain matter and cortical cerebrospinal fluid on the one hand and white brain matter on the other hand. The back-projected sulcus position is then compared to the position of grey and/or white matter and it is determined whether the back-projected is (at least within a predetermined limit) equal to a position (in the three-dimensional digital medical image and/or the image-based model) associated with white and/or grey matter.

If the method determines that the back-projected sulcus position lies within white matter is the case, the back-projected sulcus position is not used further. This helps to avoid inclusion of a part of a minimal-cost path which lies outside of a basin.

In a second aspect, the invention is directed to a computer program which, when running on at least one processor (for example, a processor) of at least one computer (for example, a computer) or when loaded into at least one memory (for example, a memory) of at least one computer (for example, a computer), causes the at least one computer to perform the above-described method according to the first aspect.

In a third aspect, the invention is directed to a non-transitory computer-readable program storage medium on which the program according to the second aspect is stored.

In a fourth aspect, the invention is directed to at least one computer (for example, a computer), comprising at least one processor (for example, a processor) and at least one memory (for example, a memory), wherein the program according to the second aspect is running on the processor or is loaded into the memory, or wherein the at least one computer comprises the program storage medium according to the third aspect.

In a fifth aspect, the invention is directed to a system for determining a position of a brain sulcus in the brain of a patient, the system comprising:
a) at least one electronic data storage device storing the patient image data and the atlas data; and
b) the at least one computer according to the fourth aspect.

The at least one computer is operably coupled to the at least one database for acquiring, from the at least one data storage device, the patient image data and the atlas data.

It is within the scope of the present invention to combine one or more features of one or more embodiments or aspects of the invention in order to form a new embodiment wherever this is technically expedient and/or feasible. Specifically, a feature of one embodiment which has the same or a similar function to another feature of another embodiment can be exchanged with said other feature, and a feature of one embodiment which adds an additional function to another embodiment can for example be added to said other embodiment.

Definitions

In this section, definitions for specific terminology used in this disclosure are offered which also form part of the present disclosure.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trademark of Google, Inc.). An augmented reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. The monitor may also be the monitor of a portable, for example handheld, device such as a smart phone or personal digital assistant or digital media player.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing the data by means of a computer and for example within the framework of the method in accordance with the invention. The meaning of "acquiring data" also for example encompasses the scenario in which the data are received or retrieved by the computer implemented method or program, for example from another program, a previous method step or a data storage medium, for example for further processing by the computer implemented method or program. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Atlas data describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

The present invention relates to the field of controlling a treatment beam. The treatment beam treats body parts which are to be treated and which are referred to in the following as "treatment body parts". These body parts are for example parts of a patient's body, i.e. anatomical body parts.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

The present invention relates to the field of controlling a treatment beam. The treatment beam treats body parts which are to be treated and which are referred to in the following as "treatment body parts". These body parts are for example parts of a patient's body, i.e. anatomical body parts.

The present invention relates to the field of medicine and for example to controlling beams, such as radiation beams, to treat parts of a patient's body, which are therefore also referred to as treatment beams, and the radiation is also called treatment radiation. A treatment beam treats body parts which are to be treated and which are referred to in the following as "treatment body parts". These body parts are for example parts of a patient's body, i.e. anatomical body parts or the above-mentioned anatomical structure. Ionising radiation is for example used for the purpose of treatment. For example, the treatment beam comprises or consists of ionising radiation. The ionising radiation comprises or consists of particles (for example, sub-atomic particles or ions) or electromagnetic waves which are energetic enough to detach electrons from atoms or molecules and so ionise them. Examples of such ionising radiation include x-rays, high-energy particles (high-energy particle beams) and/or ionising radiation emitted from a radioactive element. The treatment radiation, for example the treatment beam, is for example used in radiation therapy or radiotherapy, such as in the field of oncology. For treating cancer in particular, parts of the body comprising a pathological structure or tissue such as a tumour are treated using ionising radiation. The tumour is then an example of a treatment body part.

The treatment beam is preferably controlled such that it passes through the treatment body part. However, the treatment beam can have a negative effect on body parts outside the treatment body part. These body parts are referred to here as "outside body parts" or "non-target tissue". Generally, a treatment beam has to pass through outside body parts in order to reach and so pass through the treatment body part, specifically the target region.

DESCRIPTION OF THE FIGURES

In the following, the invention is described with reference to the appended figures which represent a specific embodiment of the invention. The scope of the invention is however not limited to the specific features disclosed in the context of the figures, wherein.

Figure 1:
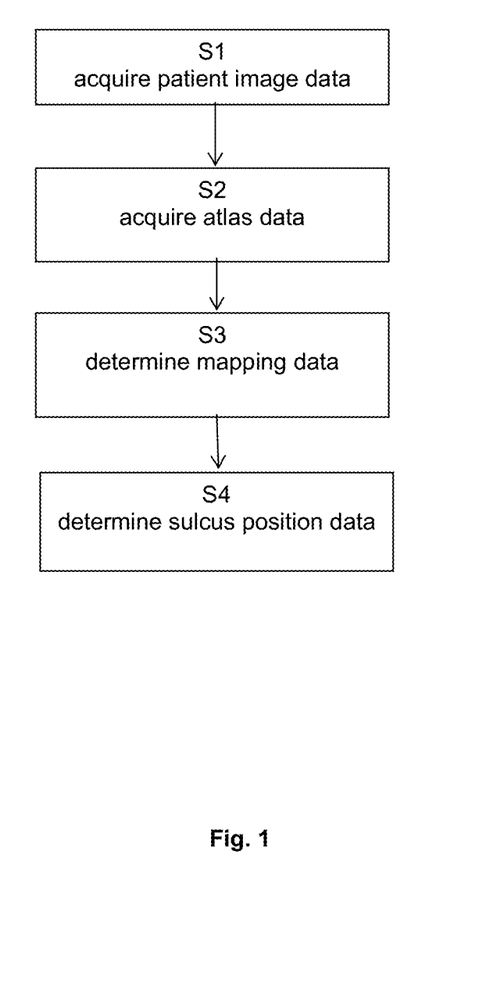
FIG. 1 is a flow diagram showing the basic steps of the disclosed method.

FIG. 1 is a flow diagram illustrating the basic steps of the disclosed method which in the illustrative example of FIG. 1 starts with a step S1 of acquiring the patient image data. Then, step S2 is executed which encompasses acquiring the atlas data. In subsequent step S3, the patient image data and the atlas data are used as a basis for determining the mapping data. The last step shown in FIG. 1 is step S4 which is directed to determining the sulcus position data.

Sulci are important landmarks for orientation on the cortex in neuroimaging. Major sulci separate individual lobes or important functional cortical areas. Due to inter-subject variability, identification and delineation of a particular sulcus may be a tedious and time consuming task. This invention discloses a method for fully automatic identification of major sulci based on prior knowledge and image processing.

Input to the sulcus identification method disclosed here is an MRI scan (as the patient image data) covering the cerebrum, in a one example with high resolution and allowing discrimination of cerebrospinal fluid (CSF), gray matter and white matter. After the selection of the desired sulcus from a list of major sulci (e.g. left central sulcus), the following pages describe how the disclosed method automatically locates and identifies the sulcus. Result of the detection pipeline is either a three-dimensional object or a triangulated surface representing the two-dimensional skeleton of the sulcus. The result can be displayed as superimposed to original or reconstructed slices or as a three-dimensional object.

Since all sulci are imbedded in cortical gray matter, a classification of the brain tissues is performed first, yielding the location of cortical CSF and gray matter. In a preferred embodiment, this is done automatically by methods known in the art, e.g. by EM (see Dempster, A. P., Laird. N. M., Rubin, D. B.: Maximum-Likelihood from incomplete data via the EM algorithm. Journal of the Royal Statistical Society, 1977) or Fuzzy C-means (see J. C. Bezdek: *Pattern recognition with fuzzy objective function algorithms*. Plenum Press, New York 1981) algorithm, using a Universal Atlas (i.e. an atlas applicable to different types of patients which is included in the atlas data) in as prior.

An estimation of the sulcus of interest as a three-dimensional object can be obtained by a registration to a Universal Atlas containing the sulcus of interest as an object. In a preferred embodiment, such a sulcus object in a Universal Atlas is created iteratively as follows: A large number of probands are matched via elastic registration (i.e. elastic image fusion) onto a Universal Atlas containing—as information about the sulci—information about only the main sulci. The averaging of these registered gray scale images reveal the position of other sulci that are present in most of the probands, which are then incorporated into the Universal Atlas using e.g. a threshold of the gray value. Systematic deviations of the positions of existing sulci from their position in the Universal Atlas are also revealed and can be corrected. This procedure (registering-averaging-refining the atlas) is repeated until no additional sulci structure is revealed. Thus, the individual sulci encoded in the universal atlas are obtained via statistical averaging from a population of subjects. Usually, such a sulcus is an excellent initial estimation for the desired sulcus of a patient (better than atlas sulci obtained from just one subject). This allows for a tighter search region for the actual sulcus detection, makes the detection method more robust and reduces computation time.

Figure 2:
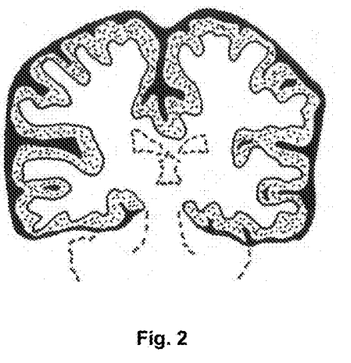
FIG. 2 shows a sulcus mask (binary mask) as the union of cortical CSF (solid black) and cortical gray matter (dotted)
Figure 3A:
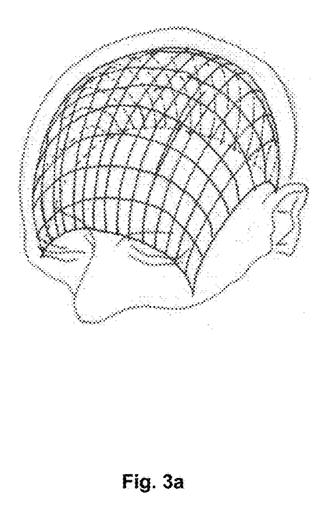
FIGS. 3a and 3b show a curved coordinate system, a slice of constant z-value (FIG. 3a) and several such slices in coronal view (FIG. 3b)
Figure 3B:
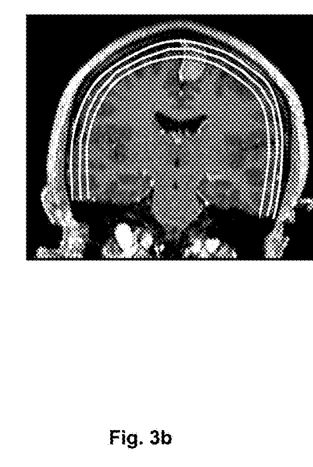
Figure 4:
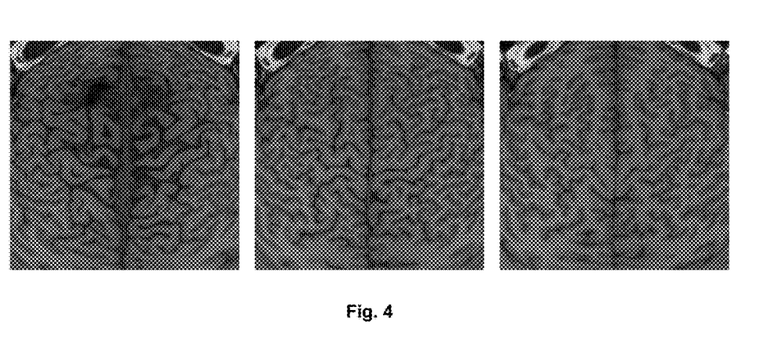
FIG. 4 shows the original image data (patient image data) sampled with respect to new coordinate system.

The disclosed method refines this initial sulcus estimation and fits it precisely to the patient anatomy. In order to accomplish this, the following steps 1 to 16 are executed sequentially:

1. Create a binary sulcus mask consisting of the union of cortical gray matter and cortical CSF. Each sulcus is entirely contained within this mask. This is illustrated by FIG. 2.
2. a) For outer sulci (i.e. sulci opening into the outer cerebral surface), determinate a new three-dimensional coordinate system, in one example with curved axes, such that rays of constant (x,y)-values are roughly perpendicular to the outer surface of the whole brain (cerebrum+CSF). "Slices" of constant z have roughly constant distance to the surface of the whole brain. This coordinate system is based on our "Mercator Projection". An illustration of the curved coordinate system is given in FIG. 3. The curved coordinate system is determined from a spherical harmonics expansion of the whole brain surface of order seven. Calculation of the midsagittal plane (known in the art, see e.g. Y. Liu, R. T. Collins, W. E. Rothfus: Automatic extraction of the central symmetry (mid-sagittal) plane from neuroradiology images, Technical Report, Carnegie Mellon University, Pittsburgh, Pa., The Robotics Institute, 1996) normalizes the orientation of x-axis and y-axis of this coordinate system, see FIG. 4. Hence, the intersections of the sulcus of interest with slices at different z-values are a family of stacked curved lines (thick if close to the outer whole-brain-surface, thin if deeper within, see FIG. 4).

b) Inner sulci (i.e. sulci on the medial wall of the cerebral surface such as cingulate sulcus and calcarine sulcus) require a straight-axis coordinate system oriented along the mid-sagittal plane which may in certain cases be approximated by curved-axis coordinate system, i.e. the curved-axis coordinate system used within the framework of the disclosed method may in certain cases (e.g. for analysis of certain anatomical regions such as the fissura longitudinalis cerebri) become close to a straight-axis coordinate system.

Figure 5:
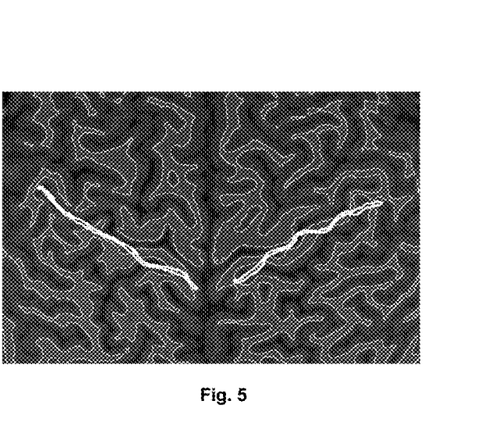
FIG. 5 shows the original image data (patient image data), estimated central sulci and white matter; note that estimated sulci are close to real sulci.
Figure 6:
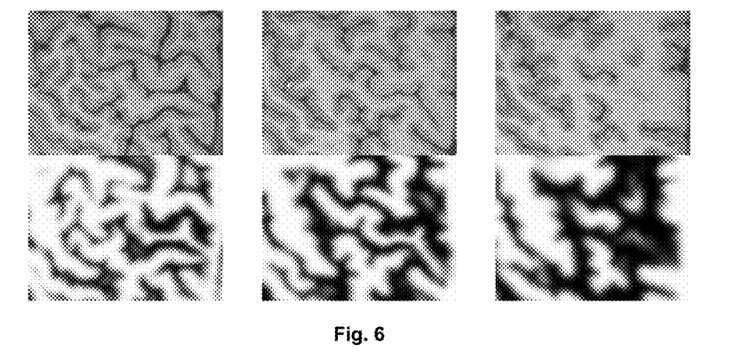
FIG. 6 shows image data and sulcus mask in slice space customized for left central sulcus.
Figure 7:
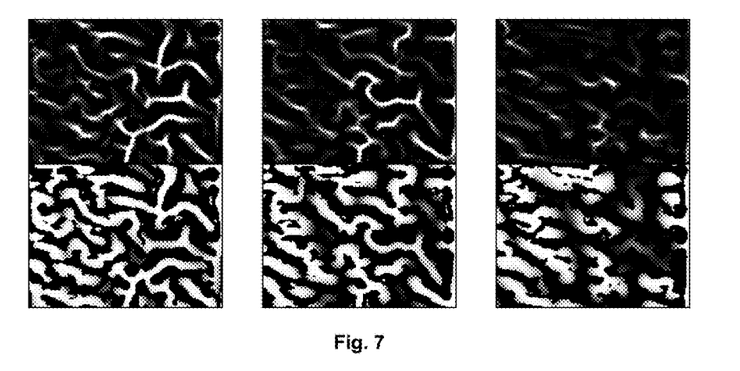
FIG. 7 shows the output of filament enhancement filter and adapted sulcus mask.
Figure 8:
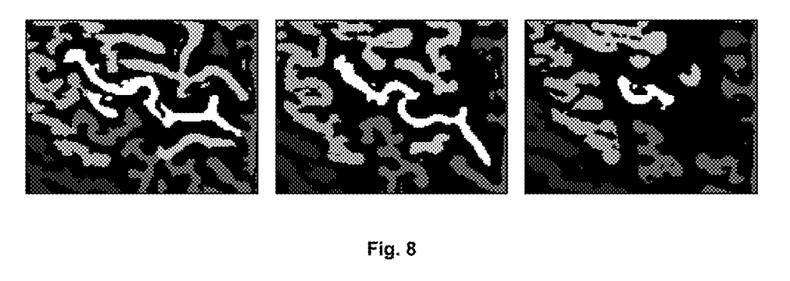
FIG. 8 shows classified sulcal basins depicted in different shades of gray.
Figure 9:
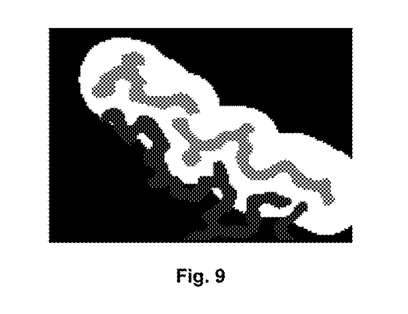
FIG. 9 shows the central sulcus: identified basins (light gray) lie in a (white) region close to estimated sulcus, rejected basins depicted in dark gray, other basins are too far apart and are not depicted at all.

3. Furthermore, an invertible (one-to-one) mapping between the new coordinate system and the original slice coordinate system is computed as the relationship between $r(\theta,\varphi)$ and (x, y). This allows coordinate transformations of points and objects between the original anatomical coordinate system and the new coordinate system from above step 2.
4. Transform the estimated sulcus (see FIG. 5) to the new coordinate system, using the mapping from above step 3.
5. Determine a bounding box containing the transformed sulcus. In one example, the bounding box is object-oriented rather than axis-aligned (FIG. 6 et seq. are rendered from an axis-aligned bounding box due to visibility reasons). Enlarge the bounding box in all directions to ensure that the true sulcus is entirely contained within.
6. According to this bounding box, determine a slice space in the new coordinate system with pixel size and slice distance similar to these values in the original slice space.
7. Reformat both the original image data and the sulcus mask with respect to this new slice space (see FIG. 6).
8. Run a two-dimensional filament detection filter on each slice of the reformatted image data. According to the MR sequence, this filter enhances either dark linear structures (for T1) or bright linear structures (for T2). The Frangi vesselness filter, e.g., fulfills the requirements for such an enhancement filter. Optionally, this filter also detects sulcus-free regions (e.g. bright ridges in a T1 scan, indicating white matter). This allows for further adaptation of the sulcus mask. The output of the filament detection filter is shown in FIG. 7.
9. Classify sulcal basins (i.e. partition the sulcus mask with respect to logically connected regions). Interpret the not allowed white matter structures as a landscape bounding the sulcus mask from below. Perform e.g. a watershed transform (see Luc Vincent and Pierre Soille: Watersheds in digital spaces: an efficient algorithm based on immersion simulations. In IEEE Transactions on Pattern Analysis and Machine Intelligence, Vol. 13, Num. 6 (1991)) on the grooves and valleys of the sulcus mask. Merge the resulting sulcal basins according to a strategy which takes into account the height difference between deepest points of two basins and the lowest point of a ridge separating them. Application of the watershed algorithm leads to a partitioning of the sulcus mask due to merging the sulcal basins. The result of classifying the sulcal basins is shown in FIG. 8.
10. Sort candidate basins with respect to a merit criterion which may take into account average distance to the sulcus estimation, elongatedness, directionality etc. The merit criterion may differ between particular sulci (e.g. different merit criteria for central sulcus and parieto-occipital sulcus)
11. Identify basins representing the particular sulcus of interest. The central sulcus (see FIG. 9), for example, consists in most cases of one basin. Nevertheless, there are cases where superior and inferior parts are separated by a ridge of reduced depth or—in rare cases—even by a gyrus.

Figure 10:
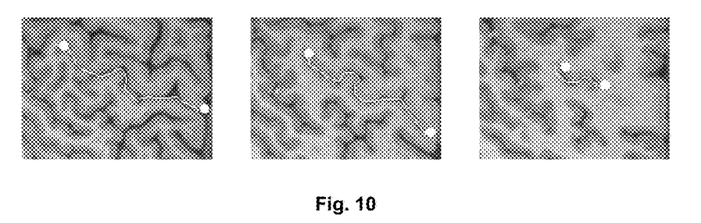
FIG. 10 shows minimal cost paths superimposed to the patient image data.

12. Calculate the union of all identified basins and identify "extremal points" in each slice (i.e. end points of the basins along their most elongated direction; see the white dots in FIG. 10). For the central sulcus, there are two extremal points per slice since its central surface is topologically equivalent to a single sheet. Other sulci may have different topologies (branching sheet) with more than two extremal points per slice.

13. Calculate a minimal cost path for each slice, connecting one extremal point with the other(s), taking into account the image data and the output of the filament enhancement filter. Hence, for T1, paths running along dark structures where the filament-likeliness is high are encouraged. Such a path can be calculated by, e.g., Dijkstra's method (see E. W. Dijkstra: A note on two problems in connexion with graphs. In: Numerische Mathematik. 1, 1959). It approximates the center line of the sulcus. Note that the path may bridge through white matter where the slice-intersection of the union of admissible sulcus basins is not connected. These bridges can be removed later.

14. The union of all minimal cost paths approximates the sulcus' central surface. Optionally, it can be converted to a surface mesh consisting, e.g., of triangles. Unlike a stack of paths consisting of points, triangle meshes are resolution-independent.

15. Remove all points of the paths outside the sulcus mask (remove all triangles not inside the sulcus mask if a triangulated surface mesh is available. This may create disconnected sub-meshes).

Figure 11:
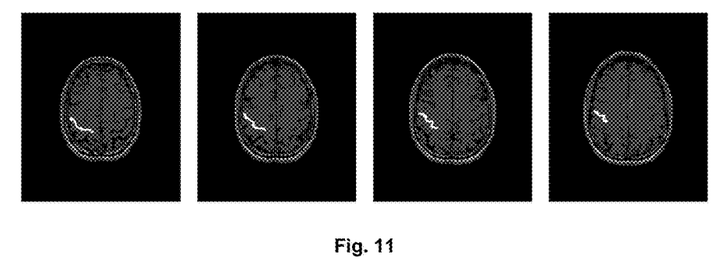
FIG. 11 shows the result of sulcus detection (left central sulcus) superimposed to original slices.

16. Transform the result (either individual path points or surface mesh) back to the original image space by applying the inverse of the mapping between coordinate systems. If no surface mesh has been calculated, apply a slight dilation to the transformed points and create a three-dimensional object from all dilated points. Visualize the three-dimensional object or the transformed surface mesh, e.g. superimposed to the original image data. The output of this transformation is illustrated in FIG. 11.

Exemplary components of the sulcus identification method disclosed here are:
  MRI scan of a human brain where the sulcus of interest is visible (e.g. T1 or T2).
  Tissue classification of the brain (whole brain mask, cortical gray matter, cortical CSF; in an advantageous embodiment provided by a universal atlas).
  Estimated position, size and shape of the sulcus of interest (in an advantageous embodiment provided by a universal atlas).
  Image reconstruction engine capable of creating a reformatted image volume with respect to a different coordinate system (not necessarily with straight axes; e.g. "Mercator View").
  One-to-one transformation describing the transition between the original image coordinates and the coordinates of said new coordinate system.
  Enhancement method capable of enhancing linear structures (either bright or dark) of variable thickness in 2D (e.g. Frangi vesselness filter).
  Classification method capable of identifying major basins of a surface in 3D. The surface consists of deep grooves/pits separated by ridges (e.g. watershed algorithm with a proper merging strategy).
  Method of finding a minimal-cost-path between two points in a 2D image (e.g. Dijkstra algorithm).
  Tesselation method capable of creating a surface mesh from a stack of 2D curves. The curves may consist of several branches depending on the sulcus they represent.

Dimensionality of the problem is effectively reduced from 3D to 2D (detection of a stack of 2D curves rather than a sheet in 3D. This is accomplished by transformation to a coordinate system whose z-Axis is roughly aligned with the sulcus. Few prior art approaches also utilize this scheme (Mutawarra Hussain and Ela Claridge, Sulcus detection in planar projection of cortical surfaces, Proceedings of the "Medical Image Understanding and Analysis" third annual conference, Oxford (1999) uses a hemispherical projection; Ikuko Uwano et. al., Computer-Assisted Identification of the Central Sulcus in Patients With Brain Tumors Using MRI, Journal of Magnetic Resonance Imaging 27:1242-1249 (2008) uses a cylindrical projection (i.e. a real Mercator view) whereas the present invention uses a projection onto a surface much more conformal to the cortical surface).

The likelihood of detecting wrong branches or other sulci is reduced by usage of a universal atlas. Hence, the initial estimation of the sulcus is already close to is real position. This reduces the size of the search region, allows for efficient elimination of wrong sulcal branches and accelerates the entire procedure.

Mutawarra and Claridge (for the citation, see above) also use some sulcus enhancement filter called "slit filter". However, they apply their filter to the entire reformatted image volume. The disclosed invention effectively reduces the workload by restricting itself to the white matter grooves and to two-dimensional slices.

For a precise location of the desired sulcus, the disclosed invention utilizes a minimal cost path running through CSF (if the image intensity indicates CSF, i.e. sulcus is not collapsed). If the image intensities do not indicate CSF, the minimal cost path runs centrally through gray matter, assuming equal cortical thickness on both sides. This means that a topologically correct sulcus is found even in cases where the image intensities do not indicate CSF (either due to partial volume effect of because the sulcus is collapsed).

The invention claimed is:
1. A method for determining a position of a brain sulcus in the brain of a patient, the method comprising executing, on at least one processor of at least one computer, steps of:
   a) acquiring, at the at least one processor, patient image data describing a digital medical image of at least part of the brain, wherein the digital medical image is represented by a data set representing a curved surface which is defined in three dimensions;
   b) acquiring, at the at least one processor, atlas data describing an image-based model of the at least part of the brain;
   c) determining, by the at least one processor and based on the patient image data and the atlas data, mapping data describing a transformation between the patient image data and the atlas data, wherein the atlas data describes color values defining the image-based model and the patient image data describes color values defining the digital medical image, and wherein the mapping data is determined by comparing the color values of the atlas data to the color values of the patient image data, wherein each color value defining the digital medical image is associated with a type of anatomical tissue and each color value defining the image-based model is associated with information about a type of anatomical tissue;

d) determining, by the at least one processor and based on the patient image data, the atlas data, and the mapping data, sulcus position data describing the position of the brain sulcus in the digital medical image, wherein the sulcus position data is determined in a projection of the digital medical image onto a planar surface which is defined in two dimensions;

e) determining, based on the mapping data, the atlas data, and the patient image data, tissue type data describing at least one type of anatomical tissue described by the digital medical image and the position of the at least one type of anatomical tissue in the digital medical image;

f) determining, based on the tissue type data, sulcus mask data describing a binary mask which can be applied to the digital medical image for masking it in order to differ, in the digital medical image, between the union of cortical grey brain matter and cortical cerebrospinal fluid on the one hand and white brain matter on the other hand; and g) filtering the sulcus position data by applying a two-dimensional filament detection filter to the sulcus position data to enhance image contrast of the sulcus.

2. The method according to claim 1, wherein the atlas data serves as a basis for estimating the position of the brain sulcus.

3. The method according to claim 1, wherein the image-based model and the digital medical image have been generated with the same imaging modality, or wherein the image-based model and the digital medical image have been generated with different imaging modalities and the atlas data comprises a mapping between a color value range associated with the imaging modality used for generating the digital medical image and a color value range associated with the imaging modality used for generating the image-based model.

4. The method according to claim 1, wherein the projection of the digital medical image is determined by projecting a curved surface in the patient image data, which is at least substantially parallel to an outer surface of the brain, onto a planar surface, wherein the curved surface is defined based on a spherical harmonics expansion of the outer brain surface up to a predetermined order.

5. The method according to claim 4, wherein the curved surface of a given distance to the outer surface is defined by its radius $r(\theta,\varphi)$ as a function of the angular coordinates $\theta$ and $\varphi$ in the digital medical image and wherein $r(\theta,\varphi)$ is expanded in real-valued spherical harmonics up to a given order $l_{max}$ so that $$r(\theta, \varphi) = \sum_{l=0}^{l_{max}} \sum_{m=-l}^{l} r_{lm} Y_{lm}(\theta, \varphi)$$

where the real-valued coefficients $r_{lm}$ are obtained by projecting $r(\theta,\varphi)$ onto the corresponding spherical harmonics:

$$r_{lm} = \int_{\theta=0}^{\pi} \int_{\varphi=0}^{2\pi} r(\theta,\varphi) Y_{lm}(\theta,\varphi) \sin\theta \, d\theta \, d\varphi,$$

and the real-valued spherical harmonics $Y_{lm}$ are defined as $$Y_{lm} = \begin{cases} \sqrt{2}\sqrt{\frac{(2l+1)(l-|m|)!}{4\pi(l+|m|)!}} P_l^{|m|}(\cos\theta)\sin(|m|\varphi) & \text{for } m < 0 \\ \sqrt{\frac{(2l+1)}{4\pi}} P_l^m(\cos\theta) & \text{for } m = 0 \\ \sqrt{2}\sqrt{\frac{(2l+1)(l-m)!}{4\pi(l+m)!}} P_l^m(\cos\theta)\cos(m\varphi) & \text{for } m > 0 \end{cases}$$

with $P_l^m(\cos\theta)$ being the associated Legendre polynomials, and wherein the curved surface $r(\theta,\varphi)$ is projected onto a planar surface defined by the coordinates x and y, and for example points towards the right lateral side of the brain and the anterior part of the brain, respectively, and wherein $r(\theta,\varphi)$ and (x, y) are related by $$x = r(\varphi - \varphi_0) \text{ and}$$

$$y = r\ln\left[\tan\left(\frac{\pi}{2} - \frac{\theta}{2}\right)\right],$$

wherein the y-axis is defined to be at $\varphi_0$, and $$\theta = \pi - 2\tan^{-1}(e^{y/r})$$

$$\varphi = \frac{x}{r} + \varphi_0,$$

wherein positions in the planar surface are projected onto the curved surface in the digital medical image by determining $r(\theta,\varphi)$ for each pair of (x, y).

6. The method according to claim 5, further comprising:
determining, based on the sulcus mask data and the relationship between $r(\theta,\varphi)$ and (x, y), projected mask data describing a projection of the binary mask onto the planar surface described by (x, y).

7. The method according to claim 6, further comprising:
determining the sulcus position data for the projected digital medical image based on the projected mask data and the projected patient image data.

8. The method according to claim 7, wherein the sulcus position data for the projected digital medical image is determined by laying the projection of the binary mask over the projected digital medical image.

9. The method according to claim 8, wherein determining the sulcus position data comprises applying a watershed transform to the masked projected digital medical image, and conducting data processing which represents merging the resulting candidate sulcal basins.

10. The method according to claim 9, further comprising:
determining the sulcus position data for the projected digital medical image based on determining candidate sulcal basins described by the sulcus position data, wherein determining the sulcus position data comprises sorting candidate basins being candidates for the sulcus basin of which the position is to be determined, wherein the candidate basins are sorted according to a criterion including at least one of an average distance of a candidate basin from the position of the brain sulcus, the elongatedness of a candidate basin, or the directionality of the candidate basin.

11. The method according to claim 10, wherein the projected and masked patient image data is slice image data generated by application of a tomographic imaging modality, and wherein merging the candidate sulcal basins comprises application of an algorithm for calculating a minimal cost path between at least two extremal points of a candidate sulcal basin, and wherein the position of a central surface of a sulcus is determined as the union of such minimal cost paths for at least two slice images of the projected and masked patient image data.

12. The method according to claim 11, further comprising:
determining, based on the union of minimal cost paths and the projected and masked patient medical image data, re-projected sulcus position data describing the position of the brain sulcus in the three-dimensional digital medical image by applying the relationship between $r(\theta,\varphi)$ and $(x, y)$.

13. The method according to claim 1, wherein the mapping data is determined by applying an image fusion algorithm to the patient image data and the atlas data.

14. The method according to claim 1, further comprising:
acquiring sulcus identification data describing the identity of at least one brain sulcus, wherein the mapping data is determined based on the sulcus identification data by determining the position of the brain sulcus described by the sulcus identification data in the image-based model.

15. The method according to claim 1, wherein the two-dimensional filament detection filter is a Frangi vesselness filter.

16. A non-transitory computer-readable storage medium having stored thereon computer-executable instructions that, when executed, configure a processor to:
acquire patient image data describing a digital medical image of at least part of the brain, wherein the digital medical image is represented by a data set representing a curved surface which is defined in three dimensions;
acquire atlas data describing an image-based model of the at least part of the brain;
determine, based on the patient image data and the atlas data, mapping data describing a transformation between the patient image data and the atlas data, wherein the atlas data describes color values defining the image-based model and the patient image data describes color values defining the digital medical image, and wherein the mapping data is determined by comparing the color values of the atlas data to the color values of the patient image data, wherein each color value defining the digital medical image is associated with a type of anatomical tissue and each color value defining the image-based model is associated with information about a type of anatomical tissue;
determine, based on the patient image data, the atlas data, and the mapping data, sulcus position data describing the position of the brain sulcus in the digital medical image, wherein the sulcus position data is determined in a projection of the digital medical image onto a planar surface which is defined in two dimensions;
determine, based on the mapping data, the atlas data, and the patient image data, tissue type data describing at least one type of anatomical tissue described by the digital medical image and the position of the at least one type of anatomical tissue in the digital medical image;
determine, based on the tissue type data, sulcus mask data describing a binary mask which can be applied to the digital medical image for masking it in order to differ, in the digital medical image, between the union of cortical grey brain matter and cortical cerebrospinal fluid on the one hand and white brain matter on the other hand; and
filter the sulcus position data by applying a two-dimensional filament detection filter to the sulcus position data to enhance image contrast of the sulcus.

17. The non-transitory computer-readable storage medium of claim 16 wherein the two-dimensional filament detection filter is a Frangi vesselness filter.

* * * * *